United States Patent [19]

Moller et al.

[11] 4,161,190

[45] Jul. 17, 1979

[54] INTEGRATED THROTTLE FOR THROTTLED AIR REMOVAL IN MULTIPLE-WAY VALVES

[75] Inventors: Rudolf Möller, Hanover; Detlef Opel, Haste, both of Fed. Rep. of Germany

[73] Assignee: WABCO Westinghouse GmbH, Hanover, Fed. Rep. of Germany

[21] Appl. No.: 832,251

[22] Filed: Sep. 12, 1977

[30] Foreign Application Priority Data

Oct. 8, 1976 [DE] Fed. Rep. of Germany ....... 2645448

[51] Int. Cl.² .............................................. F15B 13/042
[52] U.S. Cl. ............................ 137/596.18; 137/625.66; 137/625.6
[58] Field of Search ..................... 137/596.18, 625.66, 137/625.65, 625.6, 625.2; 91/443, 446

[56] References Cited

U.S. PATENT DOCUMENTS

| | | | |
|---|---|---|---|
| 2,674,266 | 4/1954 | Gardner | 137/625.66 |
| 3,045,697 | 7/1962 | Seguenot | 91/446 |
| 3,415,284 | 12/1968 | Stampfli | 137/625.66 |
| 3,646,969 | 3/1972 | Stampfli | 137/625.66 |
| 3,999,462 | 12/1976 | Chamberlain | 91/443 |

FOREIGN PATENT DOCUMENTS 1902866  4/1970  Fed. Rep. of Germany ...... 137/596.18

*Primary Examiner*—Martin P. Schwadron
*Assistant Examiner*—A. Michael Chambers
*Attorney, Agent, or Firm*—R. W. McIntire, Jr.

[57] ABSTRACT

The invention relates to a variable throttle to control the removal of air from a control line which is alternately connected with an air-inlet conduit or with an air-outlet conduit by way of a multiple-way valve.

3 Claims, 6 Drawing Figures

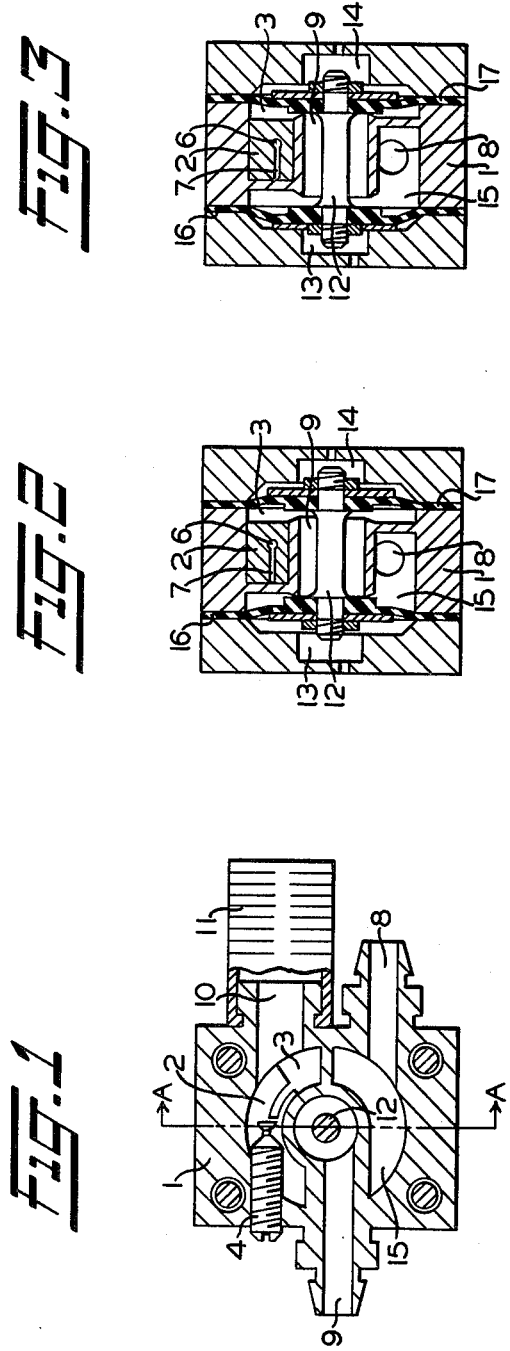

4,161,190

INTEGRATED THROTTLE FOR THROTTLED AIR REMOVAL IN MULTIPLE-WAY VALVES

BACKGROUND OF THE INVENTION

In the case of throttles which are mounted on or disposed in multiple-way valves, it is necessary to provide a stepless throttling of the pressure medium to be removed.

In order to meet this requirement, it has heretofore been proposed to employ throttle valves which are installed on or in a multiple-way valve. However, these prior proposals have resulted in expensive mechanisms of greater size and requiring additional bolted joints.

Heretofore, in a multiple-way valve having a built-in throttle, a conical element more or less seals off a hole with respect to an annular groove, thus entailing substantial manufacturing costs and requiring relatively larger space in the valve housing.

OBJECT OF THE INVENTION

The object of the invention is to provide, in the simplest and most compact manner, a throttling device built into a multiple-way valve so as to reduce the manufacturing costs and provide reliable operation.

This object is attained according to the invention, in that an annular channel disposed within a valve housing contains a slider which is connected with an axially adjustable threaded pin, the slider being disposed in a suitably circularly movable relation in the channel so as to open or close an air-outlet duct.

The advantages obtained by the invention reside particularly in the fact that the throttle consists of only two parts, can be manufactured at low cost and is assembled in a simple manner, and, in addition, provides for a reliable function and long life. A noise damper can be mounted directly to the housing at the air-outlet duct.

The drawing shows an exemplified embodiment of the invention which is further described hereinafter.

In the drawing:

FIG. 1 shows a sectional view of a multiple-way valve having an integrated throttle according to the invention.

FIG. 2 shows a cross-sectional view of the multiple-way valve taken on the cutting line A—A in FIG. 1 when the control line is pressureless.

FIG. 3 shows the cross-sectional view of the multipleway valve similar to FIG. 2, but disposed in the control position for a control line with air pressure.

FIG. 4 shows a top view of the slider of the throttle.

FIG. 5 shows a lateral view of the slider in FIG. 4 viewed from the left.

FIG. 6 shows a threaded pin having a ball end.

DESCRIPTION

In a valve housing 1, there is provided an annular channel 3 which contains a slider 2 movable along the channel.

A threaded pin 4 extends into the housing 1, is axially movably disposed in the latter and projects into the circular channel 3 wherein it is connected, in an interlocked relation, with the slider 2 by means of a ball end.

The connection between the slider 2 and the ball end 5 on the threaded pin 4 is formed by pressing the narrow area of the threaded pin 4 into the slider mounting slit 7 and snapping it into the hole 6. The mounting slit 7 in the slider 2 is narrower than the aforesaid narrow area between the threaded pin 4 and the ball end 5.

The housing 1 is further provided with two diaphragms 16 and 17 which are interconnected by means of a bolt 12.

The diaphragm 16 isolates a pressure chamber 13 from the interior of the housing and the diaphragm 17 isolates a control chamber 14 from the interior of the housing.

In the housing interior, the diaphragm 16 is provided as a control member so as to selectively interconnect the control line 9 and the air-outlet duct 10, while diaphragm 17 selectively interconnects the air-supply line 8 and air-inlet duct 15 to the control line 9.

A noise damper 11 is provided on the outside of the housing directly at the air-outlet duct 10.

In order to make the slider 2, when installed, fit in a slightly restrained sliding manner, the central points of the radii $R_1$ and $R_2$ are not concentric before installation so that when installed in the valve there results a certain amount of contact pressure when the slider is in place in the annular channel 3.

The slider 2 is preferably formed with a simple slider of a synthetic material which, by screwing the threaded pin 4 inwardly or outwardly in a straight line, can be circularly displaced in the annular channel in the housing to close or open, respectively, the conduit 10.

In the control position of the diaphragms 16 and 17 as shown in FIG. 2, in which pressure is applied to chamber 13 and released from chamber 14, the control line 9 is connected with the air-outlet duct 10, so that air can escape from the control line 9.

The rate at which air escapes depends on the position which the slider 2 assumes with respect to the air-outlet duct 10.

As a result of the circular displacement of the slider 2 caused by the axial diaplacement of the threaded pin 4, the air-outlet duct 10 which leads to the annular channel 13 is widened and closed in a stepless manner or is opened again, as desired, and, consequently, in the control position of the diaphragms 16 and 17 as shown in FIG. 2, air can escape from the control line 9 in a more or less forceful manner.

However, when air is not to be removed from, but is to be supplied to, the control line, then the diaphragms 16 and 17—interconnected by means of the bolt 12—are correspondingly shifted to the control position as shown in FIG. 3 as a result of reduction of pressure in chamber 13 or increase in pressure in chamber 14, so that consequently the air-outlet duct 10, and therefore also the integrated throttle of the invention, are put out of operation, and the control line 9 is, in this position, connected with the air-supply line 8 via the air-inlet duct 15.

The multiple-way valve is switched from the latter position back to the air-removal position, as shown in FIG. 2, as a result of the pressure increase in chamber 13 and the lower or zero pressure in control chamber 14.

The simple design of the throttle according to the invention assures a reliable operation and a simple adjustment of the throttling of the air to be removed.

Having now described the invention, what we claim as new and desire to secure by Letters Patent, is:

1. A multiple-diaphragm supply and exhaust valve having a throttle, comprising:
   (a) a valve casing having a cavity therein;
   (b) a support port, an exhaust port and a control port communicating with said cavity;

(c) a pair of control pressure chambers;

(d) means including a plurality of diaphragms operable in response to pressure in one of said pair of control pressure chambers to establish a first communication between said supply port and said control port and operable in response to pressure in the other of said part of control pressure chambers to establish a second communication between said control port and said exhaust port;

(e) an arcuately extending channel in said cavity, said channel having one side intersecting said exhaust port and having an adjacent side open to said control port when said second communication is established;

(f) a throttle member disposed in said arcuate channel for sliding movement along said channel to open and close said communication between said exhaust port and said side of said channel;

(g) threaded passage means in said casing communicating with said arcuate channel intersecting said exhaust port; and (h) screw means threadedly received in said passage means and having one end connected to said throttle member to slide said throttle member along said channel to open or close said exhaust passage depending upon the direction of axial adjustment of said screw.

2. A multiple-diaphragm supply and exhaust valve having a throttle, as recited in claim 1, in which said one end of said screw carries an integral ball member spaced from said one end of said screw by a necked portion, said ball disposed in a hole in one end of said throttle member, said hole having a diameter smaller than the ball diameter and being integral with a slot extending to one face of the slider, said slot receiving said necked portion for connecting said ball in said hole.

3. A multiple-diaphragm supply and exhaust valve having a throttle, as recited in claim 1, in which said throttle member is of greater width at one end than said channel before insertion in said channel and includes a longitudinally extending slot in the end of greater width to provide a pair of laterally disposed end portions laterally flexible toward each other upon insertion of the throttle member in the channel to provide contact pressure against the corresponding sides of the channel.

* * * * *

UNITED STATES PATENT AND TRADEMARK OFFICE
CERTIFICATE OF CORRECTION

PATENT NO. : 4,161,190
DATED : July 17, 1979
INVENTOR(S) : Rudolf Moller and Detlef Opel It is certified that error appears in the above-identified patent and that said Letters Patent are hereby corrected as shown below:

Column 3, line 7, delete "part" and insert --pair-- line 18, after "channel", insert --intersecting said exhaust port-- lines 20-21, delete "intersecting said exhaust port"

Signed and Sealed this

Twenty-fourth Day of June 1980

[SEAL]

Attest:

SIDNEY A. DIAMOND

Attesting Officer

Commissioner of Patents and Trademarks